Patented Feb. 11, 1947

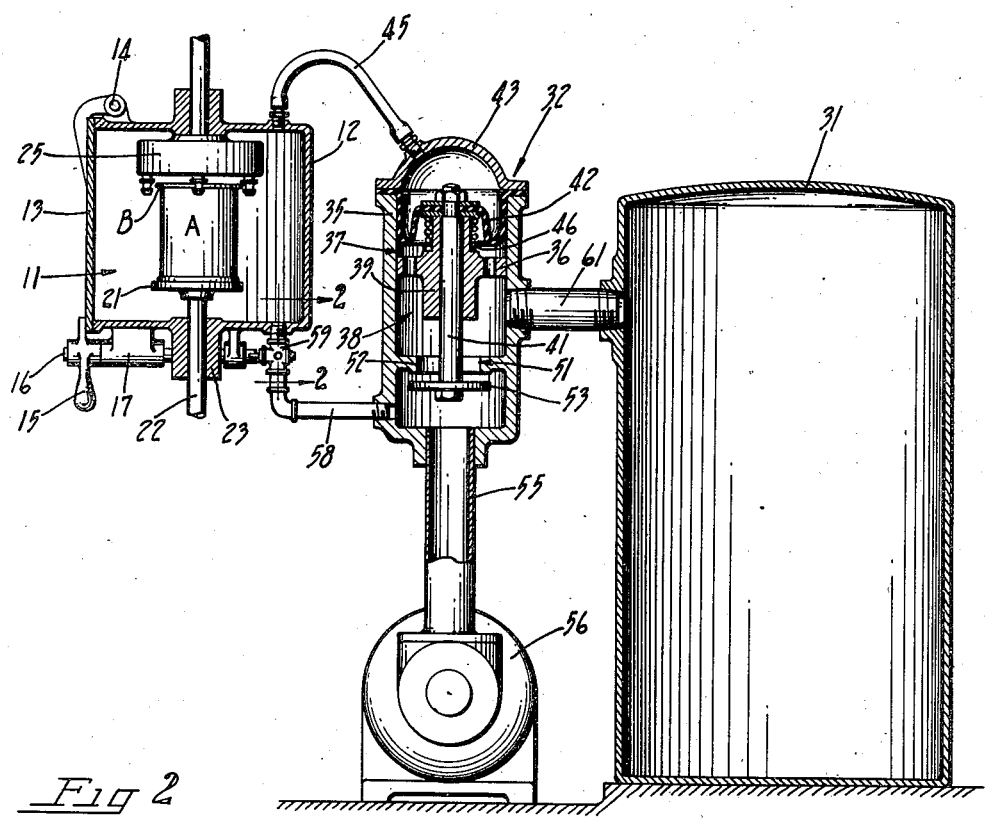
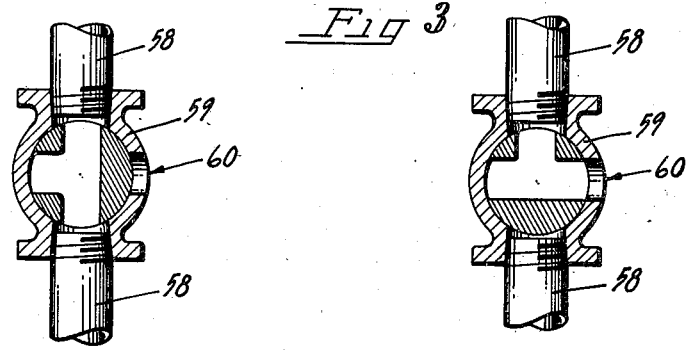

2,415,409

UNITED STATES PATENT OFFICE 2,415,409

METHOD OF AND APPARATUS FOR VACUUMIZING CONTAINERS

Stellan Birkland, San Francisco, Calif., assignor to American Can Company, New York, N. Y., a corporation of New Jersey Application January 8, 1942, Serial No. 426,096

8 Claims. (Cl. 226—82)

The present invention relates to a method of and apparatus for vacuumizing containers and has particular reference to high speed and economical vacuumizing of the containers.

In the vacuumizing of containers, cans or other such articles preparatory to sealing them it is customary to place the container, can or article in a sealing chamber. Usually the sealing chamber is maintained under as constant a vacuum as can be maintained while passing the article to be vacuumized into and out of the chamber by way of valve units. Such machines usually are highly automatic and tend to be costly in construction and operation insofar as the vacuum maintenance is concerned.

In other machines of semi-automatic character where single articles are placed manually into a sealing chamber the vacuum created within the chamber usually must be broken and dissipated each time a sealed article is removed from the chamber and a new article to be sealed is placed therein. In such semi-automatic machines, re-vacuumizing of the sealing chamber for each article to be sealed is a slow and costly matter.

The instant invention contemplates overcoming these difficulties by providing a method of and apparatus for rapidly and economically vacuumizing the sealing chambers of such semi-automatic machines.

An object therefore of the invention is the provision, in a machine for vacuum sealing containers, cans or other articles, of a method of and apparatus for vacuumizing the sealing chamber wherein the vacuumizing of the chamber is effected in a rapid and economical manner so that cheaper, more efficient, high speed production may be obtained.

Numerous other objects and advantages of the invention will be apparent as it is better understood from the following description, which, taken in connection with the accompanying drawing, discloses a preferred embodiment thereof.

Referring to the drawing:

Figure 1 is a vertical sectional schematic view of a form of apparatus embodying the instant invention and utilized for carrying out the method steps of the invention; and Figs. 2 and 3 are sectional details taken substantially along the line 2—2 in Fig. 1, and showing a valve part in different positions.

As a preferred embodiment of the instant invention the drawing illustrates principal parts of a semi-automatic can closing machine of the character disclosed in United States Patent 2,113,591, issued April 12, 1938, to S. S. Jacobs, on Vacuum closing machine.

Such a machine includes a can sealing chamber 11 which is enclosed on all sides but one by walls of a housing 12 which may be a part of the main frame of the machine. The one open side of the chamber is closed by a door 13 mounted on hinges 14 preferably formed for the most part as integral parts of the door and the housing. The door may be opened to insert a can A and a loosely applied cover B and to remove the sealed can from the sealing chamber. When the door is in a closed position it may be locked by a latch handle 15 mounted on a shaft 16 carried in a bearing lug 17 formed on the housing.

A can A placed into the sealing chamber 11 for vacuumizing and sealing is received on a lifter pad 21 located within the chamber. The pad is secured to the upper end of a depending stem 22 which extends outside of the housing 12 and which slides vertically in a bearing 23 formed in the housing. This stem is actuated in any suitable manner such for example as disclosed in the above mentioned Jacobs patent.

Above the lifter pad 21 and located within the sealing chamber 11, is a rotatable sealing head 25. This head is a usual can closing head such for example as disclosed in the said Jacobs patent and is mounted in the housing 12 and actuated in substantially the same manner as in said patent.

In operation, the sealing chamber 11, after receiving its can A and cover B and after the door 13 is closed and locked, is vacuumized automatically to the desired degree. The can within the chamber is also vacuumized. The lifter pad 21 then elevates the can and its superimposed cover, up into the sealing head 25 where the cover B is securely united to the can. The sealed can thereafter is drawn away from the sealing head by the lifter pad descending to its original position and this completes the sealing of the can. The sealed can may then be removed from the chamber by unlocking and opening the door 13.

In the instant invention the vacuumizing of the sealing chamber 11 is brought about by the use of a receiver or vacuum storage tank 31, of a capacity several times that of the chamber, constituting an auxiliary source of vacuum, and a valve unit 32 interposed between the tank and the sealing chamber. The valve unit includes a valve casing 35 having an interior, perforated spider web 36 which sets off within the casing an upper compartment 37 and a connecting lower compartment 38. The spider web is formed with a bearing 39 which carries a valve stem 41.

The upper end of the valve stem 41 extends into the upper compartment 37 and carries a flexible vacuum cup 42 which closes off the top of the upper compartment. The outer edge of this cup is clamped to the top of the valve casing 35 by a convex shaped cap 43 which is bolted thereto. The interior of the upper valve casing compartment 37 above the vacuum cup is connected to the sealing chamber 11 by way of a tube 45, the ends of which are secured in connections threaded into the cap and into the chamber housing.

Hence the upper surface of the vacuum cup 42 is subjected at all times to the air pressure or vacuum condition, whichever prevails, in the sealing chamber. The vacuum cup is maintained under the pressure of a compression spring 46 which surrounds the valve stem 41 and which is interposed between the cup and the spider 36.

The lower end of the valve stem 41 extends down through the lower valve compartment 38 and projects through an opening 51 which is surrounded by a valve seat 52 formed inside the valve casing 35. Below the valve seat, the stem is formed with a pressure valve head 53 which is adapted to engage against the seat 52.

The bottom of the valve casing 35 is connected by a vacuum line pipe 55 to a suitable source of vacuum, such for example, as a continuously operating vacuum pump 56 constituting a main or original source of vacuum. The bottom of the valve casing is also connected to the sealing chamber 11 by way of a conduit 58 having its ends secured in the walls of the chamber housing and the valve casing. This conduit includes a two-way hand valve 59 (Fig. 2), the rotating member of which is mounted on the door locking handle shaft 16.

In one position of the handle 15, as when the door is locked, the ports in the valve open communication between the chamber and the conduit as shown in Fig. 2. In another position of the handle, as when the door is unlocked, the ports of the valve open the chamber to atmosphere by way of an opening 60 in the valve casing as shown in Fig. 3.

The receiver 31 is connected to the lower compartment 38 of the valve casing 35 between the spider 36 and the valve seat 52. This connection is brought about by a pipe 61 which has its opposite ends secured in the outer walls of the receiver and of the valve casing respectively.

Thus when the door 13 on the sealing chamber housing 12 is open to insert a can to be vacuumized and sealed, atmospheric pressure obtains within the chamber. This condition is communicated by way of the tube 45 to the upper valve casing compartment 37 and to the upper surface of the vacuum cup 42.

Since the vacuum pump 56 is continuously drawing a vacuum in the valve casing below its valve seat 52, the atmospheric air pressure on the cup 42 forces the valve stem 41 down to hold the valve head 53 away from its seat 52 so that the valve will be open. The receiver 31 is thus directly connected with the pump 56 and is being vacuumized at all times when the door on the sealing chamber housing 12 is open.

When the door 13 is closed and locked, the sealing chamber 11 is brought into communication with the receiver 31 by way of the conduit 58, the thus opened locking valve 59, the open valve unit 32, 53, and pipe connection 61. The atmospheric air pressure of the sealing chamber which obtained at the time of the door was closed now is broken as the air rushes into the vacuumized receiver 31 and the air pressure condition of the chamber is thus rapidly dissipated. This dissipation of the air condition in the sealing chamber immediately is communicated by way of the tube 45 to the upper surface of the vacuum cup 42 and thus brings about an equalized air pressure condition on both sides of the cup. The compression spring thereupon draws up the valve stem 41 and hence closes the valve head 53 against its seat 52.

With the valve unit 32, 53, closed, the receiver 31 with the air received from the sealing chamber now is cut off from the chamber. The closing of the valve also cuts off the receiver from the vacuum pump 56. Immediately, the full efficiency of the pump is effective on the sealing chamber by way of the conduit 58. The pump acting solely on the sealing chamber quickly exhausts air therefrom and from the can therein. It will be remembered that just prior to being connected to the pump, the sealing chamber atmosphere was greatly reduced being in communication with the receiver 31 as just described.

In this manner a two stage process of vacuumizing the sealing chamber is brought about rapidly and economically. In the first step the air content of the chamber 11 is reduced rapidly to a negligible amount of bringing the chamber 11 into communication with the vacuumized receiver 31, and in the second step the entire pull of the vacuum pump 56 is brought into play to rapidly exhaust the small quantity of air remaining in the chamber after communication with the receiver. Not only does this save time but insures a higher vacuum in the sealing chamber.

It is thought that the invention and many of its attendant advantages will be understood from the foregoing description, and it will be apparent that various changes may be made in the form, construction and arrangement of the parts and that changes may be made in the steps of the process described and their order of accomplishment without departing from the spirit and scope of the invention or sacrificing all of its material advantages, the form hereinbefore described being merely a preferred embodiment thereof.

I claim:

1. In a machine for vacuumizing and sealing containers, the combination of a sealing chamber for confining a container to be vacuumized, two sources of vacuum communicably connected with said chamber for simultaneously drawing a vacuum on said chamber to partially vacuumize the same, a normally open pressure valve disposed between said chamber and one of said sources of vacuum, means for closing said valve, a casing surrounding said valve, the interior of said casing being in communication with said chamber, and a flexible cup disposed within said casing and operable in accordance with the vacuum condition in said chamber to permit said valve to be closed by said closing means when a predetermined vacuum has been created in said chamber to shut off from the chamber said one source of vacuum and to complete the vaccumizing of said chamber by means of the other source of vacuum alone.

2. In a machine for vacuumizing and sealing containers, the combination of a sealing chamber for confining a container to be vacuumized, two sources of vacuum communicably connected with said chamber for simultaneously drawing a vacuum on said chamber to partially vacuumize the same, a normally open pressure valve disposed between said chamber and one of said sources of vacuum, means for closing said valve, and means responsive to the vacuum condition in said chamber for permitting said valve to be closed by said closing means when a predetermined vacuum has been created in said chamber to shut off from the chamber said one source of vacuum and to complete the vacuumizing of said chamber by means of the remaining source of vacuum alone.

3. In a machine for vacuumizing and sealing containers, the combination of a sealing chamber for confining a container to be vacuumized, two vacuum sources communicably connected with said chamber and operable for simultaneously drawing a vacuum on said chamber as an initial vacuumizing step, a valve disposed between said chamber and one of said vacuum sources, and actuating means operable as the result of a predetermined degree of vacuum created in said sealing chamber by both of said vacuum sources for actuating said valve to shut off communication with one of the sources of vacuum while the other vacuum source continues effective on said sealing chamber as a final vacuumizing step on said confined container.

4. In a machine for vacuumizing containers, the combination of a chamber for confining a container to be vacuumized, two sources of vacuum communicably connected with said chamber for simultaneously drawing a vacuum on said chamber to partially vacuumize the same, a normally open pressure valve disposed between said chamber and one of said sources of vacuum, means for closing said valve, a casing surrounding said valve, the interior of said casing being in communication with said chamber, and a flexible member disposed within said casing and operable by a balanced pressure condition on opposite sides of said flexible member to permit said valve to be closed by said closing means to shut off from the chamber said one source of vacuum and to complete the vacuumizing of said chamber solely by the other of said sources of vacuum.

5. In a machine for vacuumizing containers, the combination of a chamber for confining a container to be vacuumized, two sources of vacuum communicably connected with said chamber for simultaneously drawing a vacuum on said chamber to partially vacuumize the same, a normally open pressure valve disposed within a casing between said chamber and one of said sources of vacuum, means for closing said valve, and means responsive to a balanced pressure condition in said casing for permitting said valve to be closed by said closing means when a predetermined vacuum has been created in said chamber to shut off from the chamber one source of vacuum and to complete the vacuumizing of said chamber solely by the remaining of said sources of vacuum.

6. In a machine for vacuumizing containers, the combination of a chamber for confining a container to be vacuumized, two vacuum sources communicably connected with said chamber and operable for simultaneously drawing a vacuum on said chamber as an initial vacuumizing step, a valve disposed within a casing between said chamber and one of said vacuum sources, and means operable as the result of a balanced pressure created in said chamber by both of said vacuum sources and communicated to said casing for actuating said valve to shut off communication of the chamber with one of the sources of vacuum while the other vacuum source alone continues effective on said sealing chamber as a final vacuumizing step on said confined container.

7. The method of vacuumizing containers to be sealed, comprising confining a container to be vacuumized, bringing said confined container into communication with separate main and auxiliary sources of vacuum having a normally open valve therebetween provided with a pressure controlled actuating means, said vacuum sources operating simultaneously for vacuumizing the container, and creating a subatmospheric pressure condition in the line of communication between the confined container and one of said vacuum sources, and utilizing such pressure condition to balance the pressure on opposite sides of said pressure controlled valve actuating means to close the valve and shut off communication between the container and said auxiliary vacuum source, whereby to complete the vacuumizing of the container solely from said main vacuum source.

8. The method of vacuumizing containers to be sealed, comprising confining a container to be vacuumized, bringing said confined container into communication with separate main and auxiliary sources of vacuum having a normally open valve therebetween provided with a pressure controlled actuating means, said vacuum sources operating simultaneously for vacuumizing the container, creating a subatmospheric pressure condition in the line of communication between the confined container and one of said vacuum sources, and utilizing such pressure condition to balance the pressure on opposite sides of said pressure controlled valve actuating means to close the valve and shut off communication between the container and said auxiliary vacuum source, whereby to complete the vacuumizing of the container solely from said main vacuum source, then shutting off communication between said main vacuum source and the confined container and creating an unbalanced pressure differential on opposite sides of said pressure controlled valve actuating means to open said valve for replenishing said auxiliary vacuum source through said main vacuum source preparatory to performing the described vacuumizing operation upon another container.

STELLAN BIRKLAND.

REFERENCES CITED

The following references are of record in the file of this patent:

UNITED STATES PATENTS

| Number | Name | Date |
|---|---|---|
| 1,945,954 | Podell | Feb. 6, 1934 |
| 2,079,055 | Ward | May 4, 1937 |
| 2,113,591 | Jacobs | Apr. 12, 1938 |
| 2,292,887 | McBean | Aug. 11, 1942 |
| 1,753,280 | Baumann et al. | Apr. 8, 1930 |
| 826,249 | Hovey | July 17, 1906 |
| 1,244,508 | Kramer et al. | Oct. 30, 1917 |
| 2,335,502 | Exley | Nov. 30, 1943 |